(No Model.)
G. P. BRINTNALL.
HORSE ICE CREEPER.
No. 548,353. Patented Oct. 22, 1895.
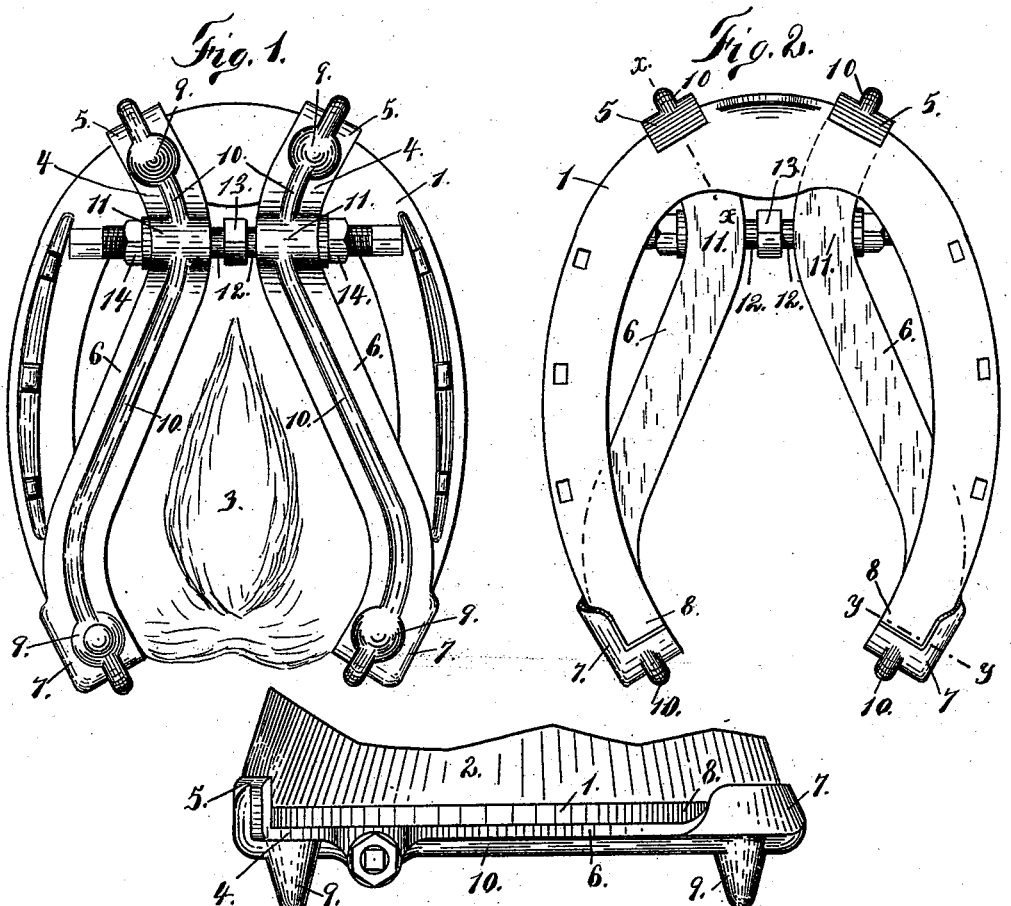
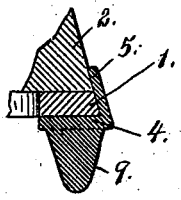
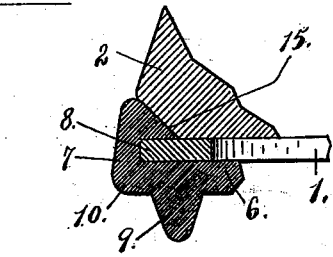
Witnesses:
Inventor
George P. Brintnall
by W. F. Miller
Atty

UNITED STATES PATENT OFFICE.

GEORGE P. BRINTNALL, OF BUFFALO, NEW YORK.

HORSE ICE-CREEPER.

SPECIFICATION forming part of Letters Patent No. 548,353, dated October 22, 1895.

Application filed June 6, 1895. Serial No. 551,855. (No model.)

*To all whom it may concern:*

Be it known that I, GEORGE P. BRINTNALL, a citizen of the United States, residing at Buffalo, in the county of Erie and State of New York, have invented certain new and useful Improvements in Horse Ice-Creepers; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in ice-creepers or antislipping attachments for horses' hoofs.

The object of my invention is to provide an attachment which can be quickly and securely applied to the shoe of a horse's hoof, which avoids all contact with the frog of the hoof and which will neither expand or contract the hoof.

To that end my invention consists of an ice-creeper composed of twin sections provided on their under sides with spurs or calks, their forward ends having inwardly-inclined flat flanges for engaging with the front of the shoe and their rear ends having inwardly-inclined angular flanges for engagement with the outer corners of the rear ends of the shoe, means for adjusting the twin sections to and from each other at a point near the forward end of the shoe, the rear or longer portions of the twin sections curving out around the frog of the hoof and the front or shorter portions inclined outwardly in opposite directions.

I will now describe the manner in which I have carried out my invention and then claim what I believe to be novel.

In the drawings, Figure 1 is an under side view of my improved creeper in position upon the shoe. Fig. 2 is a top view of the same. Fig. 3 is a side view of the same, showing a portion of the hoof. Fig. 4 is a partial vertical section taken in the line *x x* of Fig. 2; and Fig. 5 is a similar section taken in the line *y y* of Fig. 2.

Referring to the drawings, 1 is the shoe secured to the hoof 2, of which 3 is the frog. The twin sections of my improved creeper have the front or shorter portions 4 4 inclined horizontally and outwardly in opposite directions, as shown, and provided at their outer ends with the flat flanges 5 5, extending upwardly and inclined inwardly, so as to lie against the outer edge of the shoe and the inclined front of the hoof at points on each side and slightly in the rear of the forward central portion of the shoe and hoof, to prevent lateral displacement.

6 6 are the rear or longer portions, which, as shown, curve out and around the frog 3 of the hoof, and are provided at their outer ends with the angular flanges 7 7, extending upwardly and inclined inwardly, so as to engage when in position with the outer corners of the rear ends 8 of the shoe.

9 are spurs or calks extending downwardly on the under sides of the portions 4 and 6 of the twin sections, which have the integral strengthening-ribs 10 extending along their entire length on their under sides. Each twin section is provided at a point near the forward end of the shoe and at the junction of the portions 4 and 6 with a screw-threaded socket 11, adapted for engagement with the ends of a rod 12, provided with right and left screw-threads. This rod 12 has the central square portion 13 for turning the rod to tighten or loosen the hold of the creeper upon the hoof. Nuts 14 14 in screw-threaded engagement with the projecting ends of the rod 12 serve to lock the twin sections to insure their hold upon the hoof.

It will be seen that with my improved construction there is no injurious contact of the creeper with the frog 3 of the hoof, and as the twin sections are drawn together by the rod 12 to tighten their hold no compression of the hoof is possible, as the strain is in line with the length of the shoe and there is, therefore, no tendency to draw together the ends of the shoe and thereby injuriously compress the hoof, as is the case with some of the creepers now in use. It is equally true that no expansion of the hoof is possible, as is the case with other forms of creepers now in use, as the four gripping-points are at the extreme ends and the front of the shoe. As an additional means of holding the creeper in place, I have provided inwardly-extending spurs 15, (see Fig. 5,) which extend over the top of the shoe, the hoof being notched to receive them.

I claim—

A creeper composed of twin-sections, provided on their under sides with spurs or calks, their forward ends having inwardly inclined flat flanges for engaging with the front of the shoe, and their rear ends having inwardly inclined angular flanges for engagement with the outer corners of the rear ends of the shoe, means for adjusting the twin-sections to and from each other at a point near the forward end of the shoe, the rear or longer portions of the twin-sections curving out around the frog of the hoof, and the front or shorter portions inclined outwardly in opposite directions.

In testimony whereof I have signed my name to this specification in the presence of two subscribing witnesses.

GEORGE P. BRINTNALL.

Witnesses:
W. T. MILLER,
F. P. RERSTEN.